US010470284B2

(12) United States Patent
Itoi et al.

(10) Patent No.: US 10,470,284 B2
(45) Date of Patent: Nov. 5, 2019

(54) PLASMA SOURCE

(71) Applicant: Nissin Ion Equipment Co., Ltd., Kyoto-shi, Kyoto (JP)

(72) Inventors: Suguru Itoi, Kyoto (JP); Hideki Fujita, Kyoto (JP)

(73) Assignee: Nissin Ion Equipment Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 15/921,749

(22) Filed: Mar. 15, 2018

(65) Prior Publication Data

US 2018/0343731 A1 Nov. 29, 2018

(30) Foreign Application Priority Data

May 23, 2017 (JP) .................. 2017-101371

(51) Int. Cl.
| | |
|---|---|
| H05H 1/11 | (2006.01) |
| H05H 1/46 | (2006.01) |
| H05H 1/14 | (2006.01) |
| G21B 1/05 | (2006.01) |

(52) U.S. Cl.
CPC .............. H05H 1/11 (2013.01); H05H 1/14 (2013.01); H05H 1/46 (2013.01); H05H 2001/4622 (2013.01)

(58) Field of Classification Search
CPC .......... G21B 1/05; G21B 1/052; G21B 3/006; G21B 1/13; G21B 3/008; G21B 1/11; G21B 1/17; G21B 1/21; G21B 1/19; G21B 3/00; H01J 37/3244; H01J 37/32724; H01J 37/32082; H01J 37/3405; H01J 37/3411
USPC ......... 250/492.3, 282, 338.1, 287, 299, 310, 250/311
See application file for complete search history.

(56) References Cited

U.S. PATENT DOCUMENTS

| | | | |
|---|---|---|---|
| 6,361,667 B1* | 3/2002 | Kobayashi | C23C 14/345 204/298.06 |
| 2005/0103623 A1* | 5/2005 | Tolmachev | C23C 14/358 204/298.06 |
| 2007/0074968 A1* | 4/2007 | Vukovic | C23C 14/358 204/192.1 |
| 2016/0233047 A1* | 8/2016 | Tang | H01J 37/32412 |

FOREIGN PATENT DOCUMENTS

JP 2000-173486 A 6/2000

* cited by examiner

*Primary Examiner* — Wei (Victor) Chan
(74) *Attorney, Agent, or Firm* — Sughrue Mion, PLLC

(57) ABSTRACT

A plasma source is provided. The plasma source includes a chamber body inside which plasma is generated, a first mirror magnet, a second mirror magnet, and a cusp magnet provided around the chamber body and spaced apart in a axial direction thereof, each comprising permanent magnets radially spaced apart from each other to form spaces between adjacent permanent magnets thereof; and a cooling medium flow passage provided in the spaces that passes a cooling medium for cooling the chamber body.

15 Claims, 4 Drawing Sheets

PLASMA SOURCE

CROSS-REFERENCE TO RELATED APPLICATION(S)

This application is based on and claims priority from Japanese Patent Application No. 2017-101371, filed on May 23, 2017, in the Japanese Patent Office, the disclosure of which is incorporated by reference herein its entirety.

BACKGROUND

1. Field

Apparatuses, devices, and articles of manufacture consistent with the present disclosure relate to a plasma source, and more particularly, to a plasma source operable to confine plasma generated in a chamber body.

2. Description of Related Art

A plasma source is used for an ion source of a type which is configured to extract an ion beam from plasma generated in a plasma chamber using electrodes. A plasma source also includes one or more magnets, and the magnets may be, for example, of a permanent magnet type or an electromagnet type to confine plasma in the chamber. During operation of the plasma source, the plasma chamber has a high temperature, and along with the rise in temperature, the magnets tend to become demagnetized.

SUMMARY

It is an aspect to provide a plasma source with a permanent magnet arrangement capable of realizing both of a reduction in size of the plasma source and suppression of temperature rise in permanent magnets.

According to an aspect of one or more exemplary embodiments, there is provided a plasma source comprising a chamber body inside which plasma is generated; a first mirror magnet and a second mirror magnet disposed around the chamber body at positions spaced apart from each other along a first direction; and a cusp magnet disposed around the chamber body at a position between the first and second mirror magnets in the first direction, wherein the first mirror magnet comprises a plurality of first permanent magnets which are arranged around the chamber body in a plane perpendicular to the first direction with a first space between adjacent ones of the first permanent magnets, each of the first permanent magnets having a first polarity, the second mirror magnet comprises a plurality of second permanent magnets which are arranged around the chamber body in the plane perpendicular to the first direction with a second space between adjacent ones of the second permanent magnets, each of the second permanent magnets having the first polarity; and the cusp magnet comprises a plurality of cusp permanent magnets which are arranged around the chamber body in the plane perpendicular to the first direction with a cusp space between adjacent ones of the cusp permanent magnets, the cusp permanent magnets having polarities that alternate around the chamber body between the first polarity and a second polarity that is different from the first polarity.

According to another aspect of one or more exemplary embodiments, there is provided a plasma source comprising a chamber body inside which plasma is generated; a first mirror magnet, a second mirror magnet, and a cusp magnet provided around the chamber body and spaced apart in a axial direction thereof, each comprising a plurality of permanent magnets radially spaced apart from each other to form spaces between adjacent permanent magnets thereof; and a cooling medium flow passage provided in the spaces that passes a cooling medium for cooling the chamber body.

BRIEF DESCRIPTION OF THE DRAWINGS

The above and other aspects will be more apparent from the following description taken in conjunction with the accompanying drawings, in which:

FIGS. 2A-2C depict a first mirror magnet, a second mirror magnet, and a cusp magnet in the plasma source of FIG. 1, according to an exemplary embodiment, in the form of sectional views taken along an X-Y plane, wherein FIGS. 2A, 2B and 2C are, respectively, a sectional view of the first mirror magnet, a sectional view of the cusp magnet, and a sectional view of the second mirror magnet;

FIGS. 3A-3C depict a first mirror magnet, a second mirror magnet, and a cusp magnet in the plasma source of FIG. 1, according to another exemplary embodiment, in the form of sectional views taken along the X-Y plane, wherein FIGS. 3A, 3B and 3C are, respectively, a sectional view of the first mirror magnet, a sectional view of the cusp magnet, and a sectional view of the second mirror magnet; and FIGS. 4A-4C depict a cooling passage in the plasma source of FIG. 1, according to an exemplary embodiment, wherein FIGS. 4A, 4B and 4C are, respectively, a perspective view of the cooling passage provided in a chamber body of the plasma source, an explanatory diagram of a ring-shaped cooling medium turnaround passage formed in a first end of the chamber body, and an explanatory diagram of arc-shaped cooling medium inlet and outlet passages formed in a second end of the chamber body.

DETAILED DESCRIPTION

Figure 1:
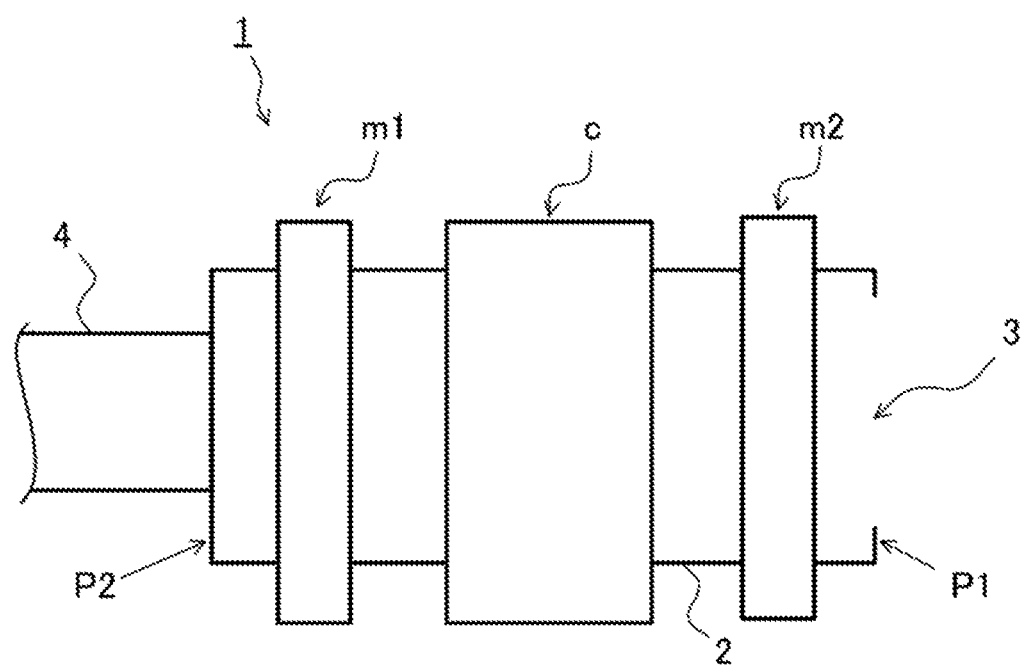
FIG. 1 is a schematic diagram depicting a plasma source according to an exemplary embodiment.
Figure 1:
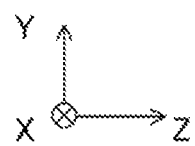

Hereinafter, various exemplary embodiments of the present disclosure will be described with reference to the accompanying drawings. One of ordinary skill in the art should understand that the present disclosure is not limited to a specific exemplary embodiment described below and with reference to the drawings, but various modifications, equivalents, and/or alternatives of the exemplary embodiments of the present disclosure are included in the scope of the present disclosure. In the accompanying drawings, similar components are assigned similar reference numerals.

As an example of a plasma source operable to confine plasma generated in a chamber defined by a chamber body, using a mirror magnet and a cusp magnet which are disposed around the chamber body, there has been known a microwave plasma source.

The plasma source is of a type which is configured to extract an ion beam from plasma generated in a plasma chamber, using an anode electrode and an extraction electrode.

Specifically, the plasma source includes a pair of mirror magnets disposed around a columnar chamber body defining the plasma chamber therein, at positions spaced apart from each other along an axial direction of the chamber (extraction direction of the ion beam); and a cusp magnet disposed around the chamber body at a position between the mirror magnets.

With a view to minimizing the size of any part of the plasma source other than the electrodes for extracting an ion beam, it is advantageous if each of the magnets is composed of a permanent magnet, instead of an electromagnet.

However, during operation of the plasma source, the plasma chamber has a high temperature, and, with a rise in temperature of each of the permanent magnets arranged around the chamber body, the permanent magnet tends to become demagnetized. Therefore, the plasma source includes a cooling means for suppressing temperature rise in the permanent magnets The related art makes no mention of a permanent magnet arrangement for satisfying both of a reduction in size of the plasma source and suppression of temperature rise in the permanent magnets.

For example, to the extent that the related art such as JP 2000-173486A suggests a permanent magnet arrangement with a view to suppress temperature rise in the permanent magnets, such arrangements cause an increase in the dimensions of the chamber body, thereby leading to an increase in size of the plasma source.

Exemplary embodiments described herein provide a plasma source capable of realizing both of a reduction in size of the plasma source and suppression of temperature rise in permanent magnets.

According to one or more exemplary embodiments, a plasma source may comprise a chamber body inside which plasma is generated; a pair of mirror magnets disposed around the chamber body at positions spaced apart from each other along a first direction; and a cusp magnet disposed around the chamber body at a position between the pair of mirror magnets, wherein each of the mirror magnets comprises a plurality of permanent magnets which are arranged around the chamber body in a plane perpendicular to the first direction with a first space between adjacent ones thereof, in such a manner that the plurality of permanent magnets have a same chamber-side polarity, wherein the chamber-side polarity of the plurality of permanent magnets comprising one of the mirror magnets is different from the chamber-side polarity of the plurality of permanent magnets comprising the other mirror magnet; and the cusp magnet is comprised of a plurality of permanent magnets which are arranged around the chamber body in a plane perpendicular to the first direction with a second space between adjacent ones thereof, in such a manner that a chamber-side polarity of each of the plurality of permanent magnets and a chamber-side polarity of an adjacent one of the remaining permanent magnets are alternately varied.

FIG. 1 is a schematic diagram depicting a plasma source 1 according to an exemplary embodiment.

This plasma source 1 comprises a columnar chamber body 2 defining a chamber therein. A microwave is introduced from a waveguide 4 into the chamber through a dielectric window (not depicted) provided in a second end P2 of the chamber body 2.

A pair of mirror magnets, including a first mirror magnet m1 and a second mirror magnet m2, are provided around the chamber body 2 at positions spaced apart from each other along the Z direction in the figures. Further, a cusp magnet c is provided around the chamber body 2 at a position between the first mirror magnet m1 and the second mirror magnet m2. In other words, looking in the Z direction from the second end P2, the magnets are arrangement in order of the first mirror magnet m1, the cusp magnet c, and the second mirror magnet m2. Plasma generated in the chamber of the chamber body 2 is confined based on a magnetic field formed in the chamber by the first and second mirror magnets m1, m2 and the cusp magnet c.

The chamber body 2 has a first end P1 formed with an opening 3 for extracting therethrough ions or electrons from plasma in the chamber, in the form of a beam, by using a non-depicted electrode.

Figure 2A:
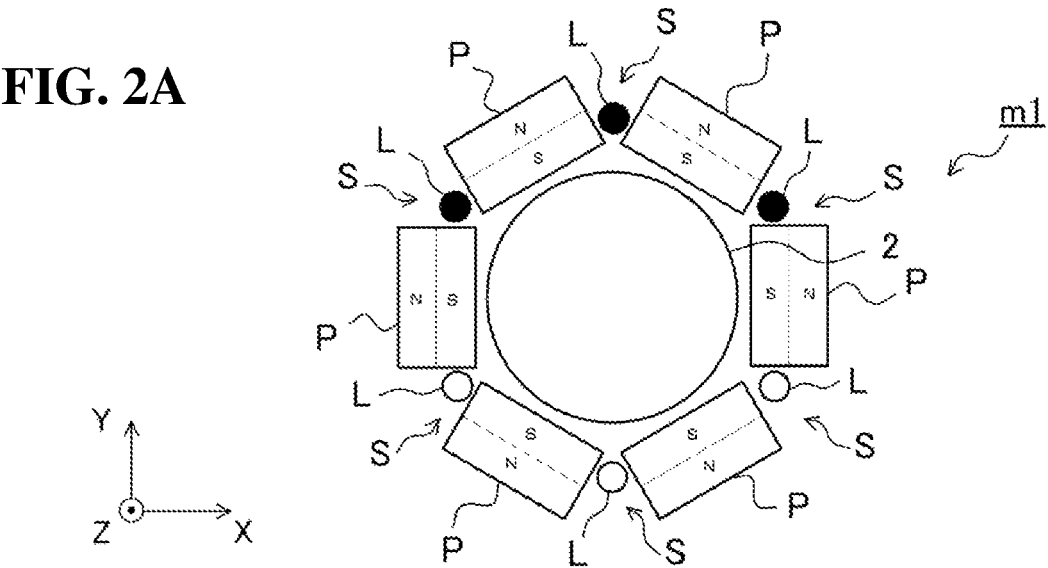
Figure 2B:
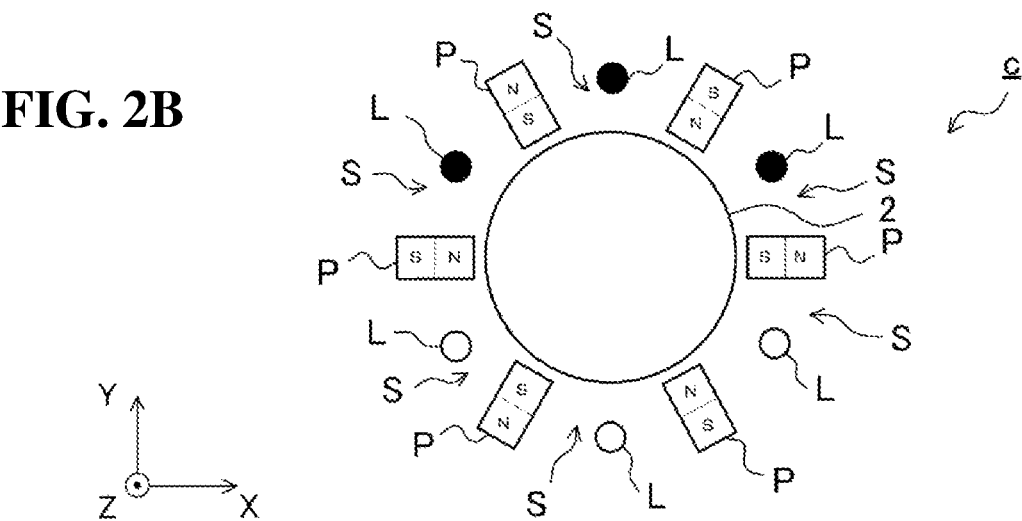
Figure 2C:
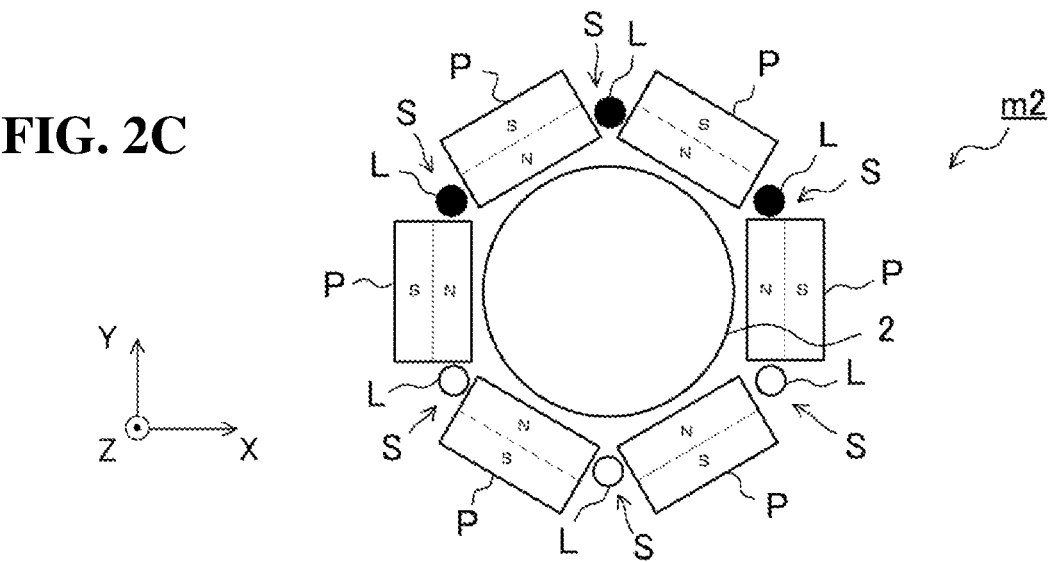

Sectional views of the first mirror magnet m1, the cusp magnet c, and the second mirror magnet m2 taken along an X-Y plane are depicted in FIGS. 2A-2C.

As depicted in FIGS. 2A and 2C, each of the first mirror magnet m1 and the second mirror magnet m2 comprises a plurality of permanent magnets P which are arranged along a circumferential direction of the chamber body 2 with a first space S and a second space S, respectively, between adjacent ones thereof, in such a manner that the plurality of permanent magnets P have the same polarity on the side of the chamber (chamber body 2), i.e., the same chamber-side polarity. In other words, the plurality of first permanent magnets P that make up the first mirror magnet m1 have the same polarity (e.g., S-N when looking outward from the center of the chamber in a radial direction) and have the first space S between adjacent ones of the permanent magnets P, and the plurality of second permanent magnets P that make up the second mirror magnet m2 have the same polarity (e.g., N-S when looking outward from the center of the chamber in a radial direction) and have the second space S between adjacent ones of the permanent magnets P. However, this is only an example, and the polarities may be reversed in some exemplary embodiments.

In this state, the mirror magnet m1 and the mirror magnet m2 are arranged differently in terms of the chamber-side polarity. Specifically, the chamber-side polarity of the mirror magnet m1 is S-pole as depicted in FIG. 2A, whereas the chamber-side polarity of the mirror magnet m2 is N-pole as depicted in FIG. 2C.

It should be noted that this polarity relationship may be reversed. That is, the chamber-side polarity of the mirror magnet m1 may be set to N-pole, and the chamber-side polarity of the mirror magnet m2 may be set to S-pole.

As can be understood from FIG. 2B, the cusp magnet c also comprises a plurality of permanent magnets P which are arranged along the circumferential direction of the chamber body 2 with a cusp space S between adjacent ones thereof. Differently from the first mirror magnet m1 and the second mirror magnet m2, the permanent magnets P of the cusp magnet c are arranged such that chamber-side polarities thereof are alternately varied along the circumferential direction of the chamber body 2, as shown in FIG. 2B.

The plurality of first permanent magnets P comprising the first mirror magnet and the plurality of second permanent magnets P comprising the second mirror magnet m2 and the plurality of permanent magnets P comprising the cusp magnets c are supported by a non-depicted yoke.

The presence of the space S in each of the first mirror magnet m1, the second mirror magnet m2, and the cusp magnet c enables a cooling medium flow passage L to be disposed therein. An external dimension of the plasma source 1 is defined by an outer periphery of the permanent magnets P disposed around the chamber body 2. Thus, a configuration in which a cooling medium flow passage L is disposed in the inter-permanent magnet space S makes it possible to minimize an influence of the cooling medium flow passage L on the external dimension of the plasma source 1, and thus facilitate a reduction in size of the plasma source 1.

Among the plurality of cooling medium flow passages L depicted in FIGS. 2A to 2C, each of the three cooling medium flow passages L indicated by the black circle is a flow passage through which a cooling medium flows from the second end P2 to the first end P1 of the chamber body 2. On the other hand, each of the three cooling medium flow passages L indicated by the white circle is a flow passage through which the cooling medium flows from the first end P1 to the second end P2 of the chamber body 2. For example, as the cooling medium, purified water may be used. However, it should be understood that this is only an example, and any other cooling medium that is capable of circulation through the cooling medium flow passages L may be used. Moreover, FIGS. 2A-2C show six cooling medium flow passages L. However, this is only an example, and the number of cooling medium flow passages L may be less than or more than six. Additionally, FIGS. 2A-2C show a cooling medium flow passage L in each space S between each adjacent two permanent magnets P of the first mirror magnet m1, second mirror magnet m2, and cusp magnet c. However, this is only an example, and in some exemplary embodiments, the cooling medium flow passage L may be provided in only a portion of the spaces S.

As depicted in FIGS. 2A-2C, each of the plurality of inter-permanent magnet spaces S between adjacent ones of the six permanent magnets that comprise each of the first mirror magnet m1 and the second mirror magnet m2, and an associated one of the plurality of inter-permanent magnet spaces S between adjacent ones of the six permanent magnets comprising the cusp magnet c, may be aligned in the Z direction. In other words, the topmost inter-permanent magnet space S in each of FIGS. 2A-2C may be aligned in the Z direction, and the remaining inter-permanent magnet spaces S may similarly be aligned in the Z direction. In this case, the cooling medium flow passage L passing through each set of the Z-directionally aligned inter-permanent magnet spaces S in the magnets m1, m2, and c can be formed in a linear shape, so that the configuration of the cooling medium flow passage L is simplified.

However, this linear shape is only an example, and the cooling medium flow passage L passing through the inter-permanent magnet spaces S does not necessarily need to have a linear shape, but may be somewhat bent, e.g., have one or more partially-bent portions, depending on the configuration.

Figure 3A:
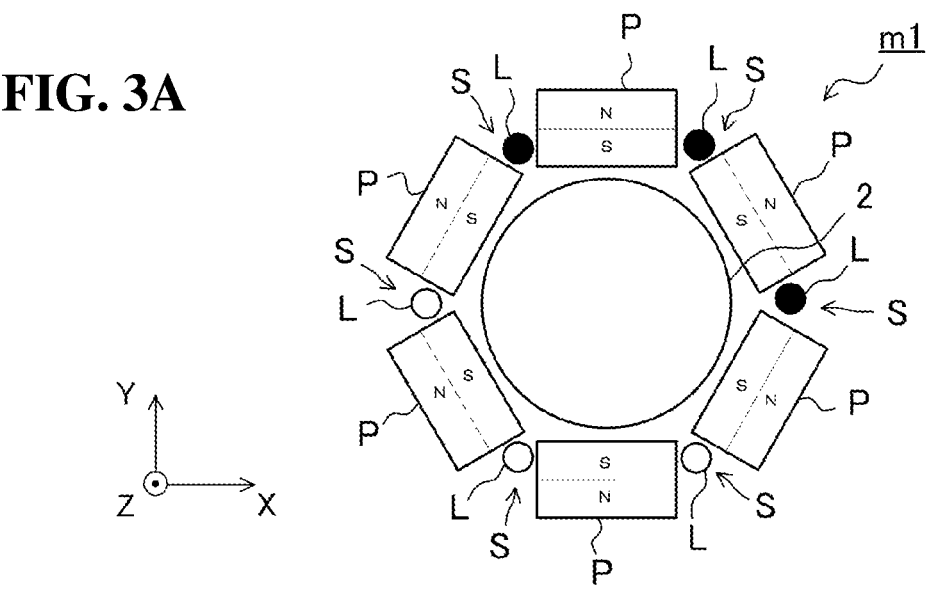
Figure 3B:
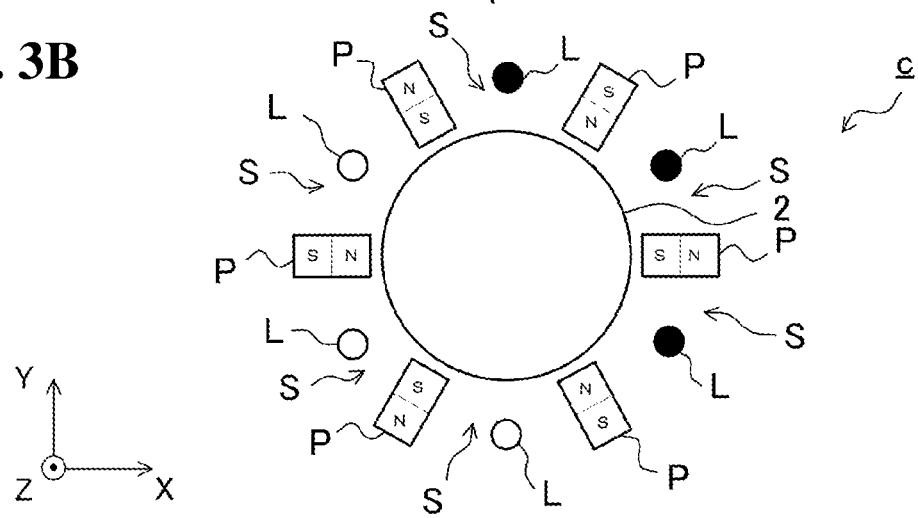
Figure 3C:
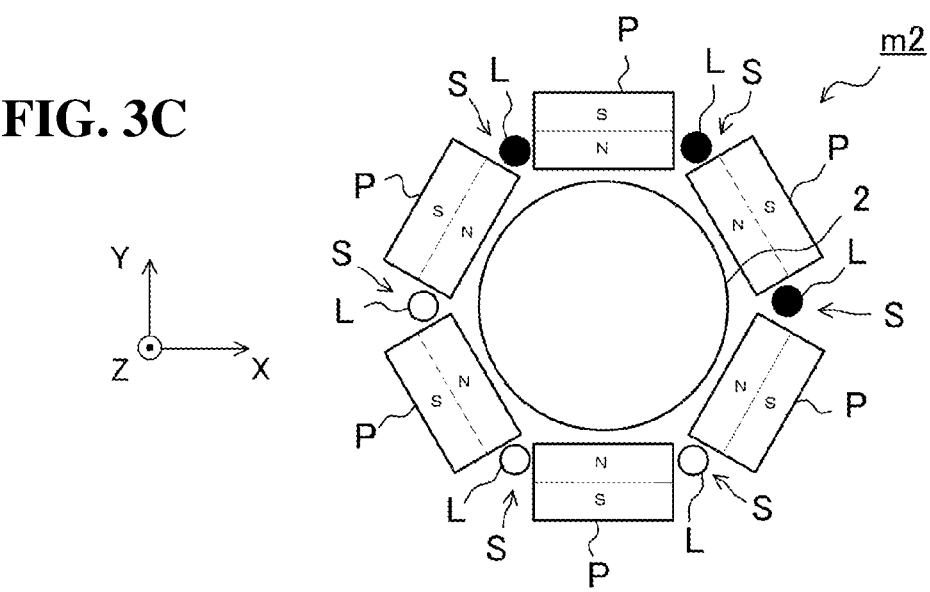

FIGS. 3A-3C show an example in which the first mirror magnet m1, the cusp magnet c, and the second mirror magnet m2 are configured such that the inter-permanent magnet spaces S are not aligned as in FIGS. 2A-2C and the cooling medium flow passage L includes partially-bent portions. In the case where the cooling medium flow passage L is bent, for example, the first mirror magnet m1, the cusp magnet c and the second mirror magnet m2 may have X-Y sections as depicted in FIGS. 3A, 3B and 3C, respectively.

In the exemplary embodiment shown in FIGS. 3A-3C, each of the inter-permanent magnet spaces S between adjacent ones of the permanent magnets comprising each of the first mirror magnet m1 and the second mirror magnet m2 are aligned, but an associated one of the inter-permanent magnet spaces S between adjacent ones of the permanent magnets comprising the cusp magnet c are not aligned and are at different positions in the X-Y plane from the inter-permanent spaces S of the first mirror magnet m1 and the second mirror magnet m2, as shown in FIGS. 3A-3C. It should be noted that it is also possible for the first mirror magnet m1, the cusp magnet c and the second mirror magnet m2 to be arranged such that each of the inter-permanent magnet spaces S are formed at different positions in the X-Y plane, such that none of the inter-permanent magnet spaces S are aligned with each other. This arrangement however increases the number of partially-bent portions.

Even in the permanent magnet arrangement depicted in FIGS. 3A-3C, the cooling medium flow passage L is provided in the inter-permanent magnet spaces S, so that it becomes possible to realize both of a reduction in size of the plasma source and suppression of temperature rise in permanent magnets, as with the arrangement shown in FIGS. 2A-2C.

Figure 4A:
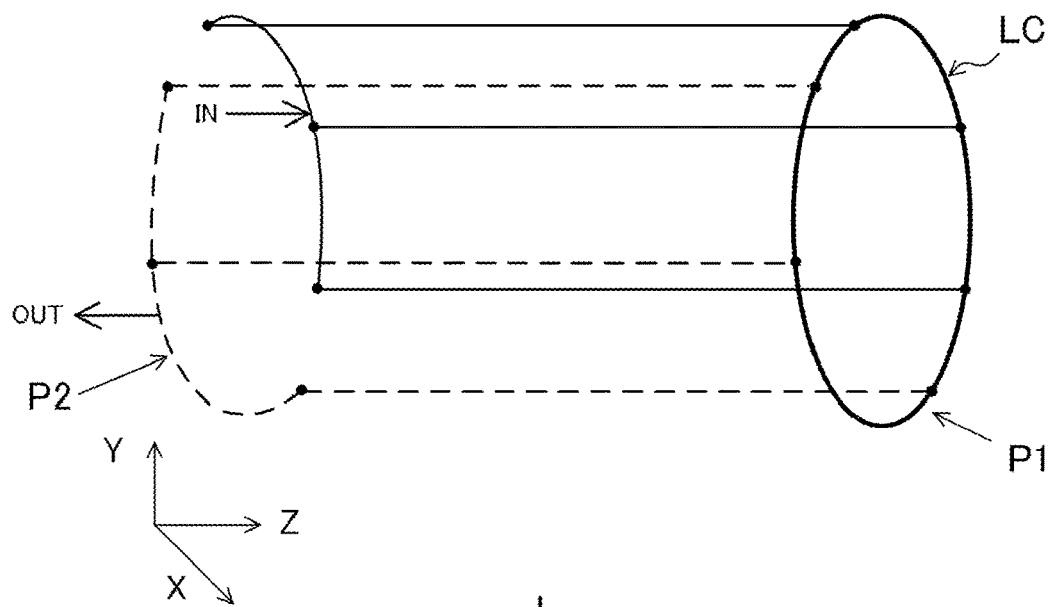
Figure 4B:
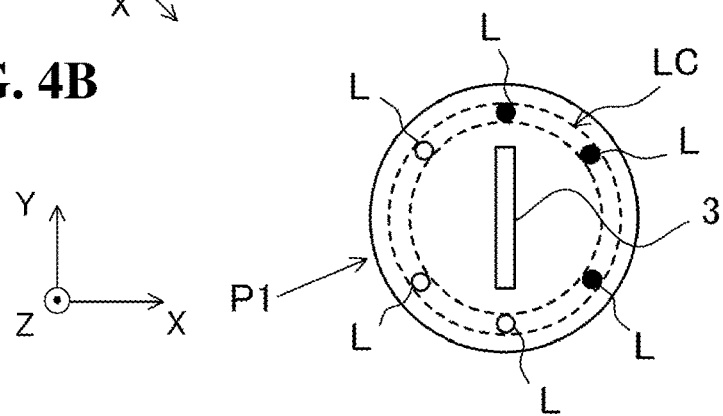
Figure 4C:
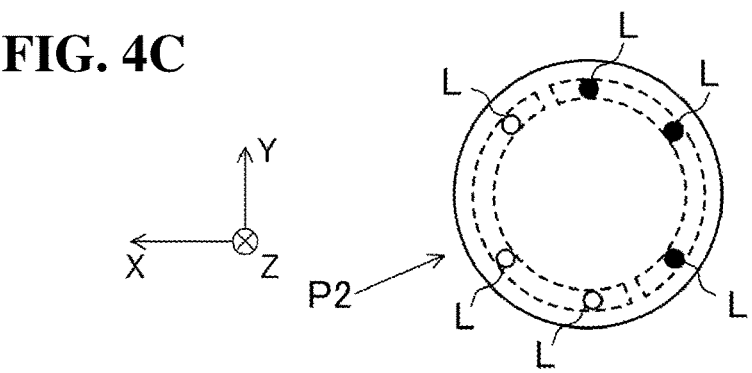

FIGS. 4A-4C depict a cooling passage in the plasma source of FIG. 1, according to an exemplary embodiment. FIGS. 4A-4C depict a configuration of a cooling passage comprising the cooling medium flow passages L in FIGS. 2A-2C. Specifically, FIG. 4A is a perspective view of the cooling passage formed in the chamber body 2. FIG. 4B depicts a ring-shaped cooling medium turnaround passage LC formed in the first end P1 of the chamber body 2 depicted in FIG. 4A. FIG. 4C depicts arc-shaped cooling medium inlet passage and an arc-shaped cooling medium outlet passage formed in the second end P2 of the chamber body 2 depicted in FIG. 4A.

The cooling medium may be supplied to the second end P2 of the chamber body 2 in a direction (e.g., a +Z direction in the example shown in FIG. 4A) indicated by the arrowed line IN in FIG. 4A. The cooling medium supplied to the chamber body 2 divides and flows into three cooling medium inflow passages L indicated by the solid lines in FIG. 4A, and, after passing through the first and second spaces S in the first mirror magnet m1, the second mirror magnet m2, and the cusp magnet c, flows to the first end P1 of the chamber body 2.

A ring-shaped cooling medium turnaround passage LC (thick line) is formed in the first end P1 of the chamber body 2. The above cooling medium inflow passages L indicated by the solid lines are connected to the ring-shaped cooling medium turnaround passage LC.

Further, three cooling medium outflow passages L (broken lines) are connected to the ring-shaped cooling medium turnaround passage LC. The cooling medium outflow passages L (broken lines) are provided as a path by which the cooling medium flows from the first end P1 to the second end P2 of the chamber body 2.

The cooling medium that has flowed back to the second end P2 through the cooling medium outflow passages L (broken lines) is discharged outside the chamber body 2 in a direction (e.g., a −Z direction in the example of FIG. 4A) indicated by the arrowed line OUT in FIG. 4A.

In some exemplary embodiments, unlike the exemplary embodiment of FIGS. 4A-4C that show a ring-shaped cooling medium turnaround passage, each of the cooling medium inflow passages L (solid lines) may be directly connected to a respective one of the cooling medium outflow passages L (broken lines) via one of a plurality of (in this exemplary embodiment, three) cooling medium turnaround passages formed in the first end P1. In other words, the three cooling medium turnaround passages may be formed by providing the cooling medium turnaround passages as a plurality of arc-shapes, for example, by cutting the ring-shaped cooling medium turnaround passage LC into the arc-shapes. Alternatively, in some exemplary embodiments, the cooling medium turnaround passage may be provided as a plurality of linear (i.e., straight) passages such that the cooling medium turnaround passage is provided in a square-like shape. However, compared to the case where a cooling medium turnaround passage is formed in the first end P1 the chamber body 2 by cutting into arc-shaped cooling medium turnaround passages or by providing a plurality of linear passages in a square-like shape, the ring-shaped cooling medium turnaround passage LC that is shown in FIGS.

4A-4C may be more readily fabricated than the arc-shaped or linear cooling medium turnaround passages.

It should be noted that the term "ring-shaped" does not necessarily denote a round shape, but may include a quadrangular or polygonal shape or the like. That is, the term "ring-shaped" herein denotes a closed loop-like shape.

In the plasma source 1 according to the exemplary embodiments described above, supply of the cooling medium to the cooling medium inflow passages and discharge of the cooling medium from the cooling medium outflow passages are performed through the second end P2. Alternatively, the supply and discharge of the cooling medium may be performed through the first end P1.

However, in the plasma source 1 according to the exemplary embodiments described above, the opening 3 is formed in the first end P1 to perform extraction of a beam such as an ion beam or release of ions or the like, through the opening 3. Thus, in the case where the supply and discharge of the cooling medium are performed through the first end P1, there is a disadvantage that the supply of the cooling medium to the cooling medium inflow passages and the discharge of the cooling medium from the cooling medium outflow passages may hinder the beam extraction or the like.

Considering this disadvantage, even if the supply and discharge of the cooling medium may be performed without hindering the release of ions or electrons or the beam extraction, an area capable of performing the supply and discharge of the cooling medium is restricted by other factors such as electrodes arranged adjacent to the opening, etc. Therefore, the supply and discharge of the cooling medium through the second end P2 may provide a more simplified configuration of the plasma source.

Although the above exemplary embodiments have been described based on an example in which the chamber body 2 has a columnar shape, the chamber body 2 may have any other suitable shape such as a rectangular parallelepiped shape, a cubic shape or a rectangular columnar shape.

Although the above exemplary embodiments have been described based on an example in which a length direction of the chamber body 2 is defined as the Z direction, the chamber body 2 may be formed such that it has a Y-directional dimension greater than a Z-directional dimension.

Although the above exemplary embodiments have been described based on an example in which a microwave is introduced into the chamber of the chamber body 2 using the waveguide 4, the plasma source may be configured to introduce any high-frequency wave other than a microwave. Further, the plasma source may comprise an antenna inserted into the chamber, in addition to the waveguide, wherein it may be configured to introduce a high-frequency wave into the chamber via the antenna.

Although the above exemplary embodiments have been described based on an example in which one cooling medium flow passage L is disposed in each set of the Z-directionally aligned or associated inter-permanent magnet spaces S, two or more cooling medium flow passages L may be disposed in each set of the Z-directionally aligned or associated inter-permanent magnet spaces S.

Although the above exemplary embodiments have been described based on an example in which the number of permanent magnets P comprising each of the first magnet m1, the second magnet m2, and the cusp magnet c is set to the same value (six, in the examples described above), this is only an example. The number of permanent magnets P needs not necessarily be set to the same value. For example, the first mirror magnet m1, the second mirror magnet m2, and the cusp magnet c may be comprised, respectively, of three sets of different numbers of permanent magnets P. That is, in some exemplary embodiments, for example, the first mirror magnet m1 may have 4 permanent magnets, the second mirror magnet m2 may have 6 permanent magnets and the cusp magnet may have 8 permanent magnets.

Exemplary embodiments provide a plasma source comprising a chamber body inside which plasma is generated; a pair of mirror magnets disposed around the chamber body at positions spaced apart from each other along a first direction; and a cusp magnet disposed around the chamber body at a position between the pair of mirror magnets, wherein each of the mirror magnets is composed of a plurality of permanent magnets which are arranged around the chamber body in a plane perpendicular to the first direction with a first space between adjacent ones thereof, in such a manner that the plurality of permanent magnets have a same chamber-side polarity, wherein the chamber-side polarity of the plurality of permanent magnets composing one of the mirror magnets is different from the chamber-side polarity of the plurality of permanent magnets composing the other mirror magnet; and the cusp magnet is composed of a plurality of permanent magnets which are arranged around the chamber body in a plane perpendicular to the first direction with a second space between adjacent ones thereof, in such a manner that a chamber-side polarity of each of the plurality of permanent magnets and a chamber-side polarity of an adjacent one of the remaining permanent magnets are alternately varied.

The plasma source may further comprise a cooling medium flow passage provided in the first space between adjacent ones of the plurality of permanent magnets composing each of the mirror magnet and the second space between adjacent ones of the plurality of permanent magnets composing the cusp magnets.

The first space between adjacent ones of the plurality of permanent magnets composing each of the mirror magnets and the second space between adjacent ones of the plurality of permanent magnets composing the cusp magnet may be aligned in the first direction.

Each of the first and second spaces may be formed plurally, wherein the cooling medium flow passage comprises a cooling medium inflow passage and a cooling medium outflow passage which are provided, respectively, in different spaces in each of a set of the plurality of first spaces and a set of the plurality of second spaces.

The chamber body may have a first end formed with an opening for releasing therethrough ions or electrons from plasma generated inside the chamber body, wherein input and output of a cooling medium with respect to the cooling medium flow passage are performed through a second end of the chamber body located on the side opposite to the first end in the first direction.

The first end of the chamber body may have a ring-shaped cooling medium turnaround passage to which one end of the cooling medium flow passage provided in the first and second spaces is connected.

According to various exemplary embodiments disclosed here, a plasma source is provided with a permanent magnet arrangement that may realize a reduction in size of the plasma source while also suppressing temperature rise in the permanent magnets in the permanent magnet arrangement.

While the present disclosure has been shown and described with reference to various exemplary embodiments thereof, it will be understood by those skilled in the art that various changes in form and details may be made therein without departing from the spirit and scope of the present disclosure as defined by the appended claims and their equivalents.

What is claimed is:

1. A plasma source comprising:
a chamber body inside which plasma is generated;
a first mirror magnet and a second mirror magnet disposed around the chamber body at positions spaced apart from each other along a first direction; and
a cusp magnet disposed around the chamber body at a position between the first and second mirror magnets in the first direction, wherein:
the first mirror magnet comprises a plurality of first permanent magnets which are arranged around the chamber body in a plane perpendicular to the first direction with a first space between adjacent ones of the first permanent magnets, each of the first permanent magnets having a first polarity on a chamber body side of the first permanent magnet,
the second mirror magnet comprises a plurality of second permanent magnets which are arranged around the chamber body in the plane perpendicular to the first direction with a second space between adjacent ones of the second permanent magnets, each of the second permanent magnets having a second polarity on a chamber body side of the second permanent magnet; and
the cusp magnet comprises a plurality of cusp permanent magnets which are arranged around the chamber body in the plane perpendicular to the first direction with a cusp space between adjacent ones of the cusp permanent magnets, the cusp permanent magnets having polarities that alternate around the chamber body between the first polarity and a second polarity; wherein the second polarity is different from the first polarity;
a plurality of cooling medium flow passage provided in the first space, the second space, and the cusp space.

2. The plasma source as recited in claim 1, wherein the first space, the second space, and the cusp space are aligned in the first direction.

3. The plasma source as recited in claim 1, wherein the cooling medium flow passage comprises a cooling medium turnaround passage.

4. The plasma course as recited in claim 3, wherein the cooling medium turnaround passage is formed in a ring shape, square shape, or a plurality of arc shapes.

5. The plasma source as recited in claim 1, wherein: a portion of the first spaces, a corresponding portion of the second spaces, and a corresponding portion of the cusp spaces form an inflow set, and remaining portions of each of the first spaces, the second spaces, and the cusp spaces form an outflow set, and the plurality of cooling medium flow passage comprises a cooling medium inflow passage that is connected to the inflow set, and a cooling medium outflow passage that is connected to the outflow set.

6. The plasma source as recited in claim 5, wherein the cooling medium flow passage comprises a cooling medium turnaround passage.

7. The plasma course as recited in claim 6, wherein the cooling medium turnaround passage is formed in a ring shape, square shape, or a plurality of arc shapes.

8. The plasma source as recited in claim 1, wherein: the chamber body comprises a first end formed with an opening for releasing therethrough ions or electrons from plasma generated inside the chamber body, and input and output of a cooling medium with respect to the cooling medium flow passage are performed through a second end of the chamber body located on a side opposite to the first end in the first direction.

9. The plasma source as recited in claim 8, wherein the first end of the chamber body has a cooling medium turnaround passage to which one end of the cooling medium flow passage is connected.

10. A plasma source comprising:
a chamber body inside which plasma is generated;
a first mirror magnet, a second mirror magnet, and a cusp magnet provided around the chamber body and spaced apart in an axial direction thereof, each comprising a plurality of permanent magnets radially spaced apart from each other to form spaces between adjacent permanent magnets thereof;
a plurality of cooling medium flow passages provided in the spaces that passes a cooling medium for cooling the chamber body;
a plurality of inflow passages formed at a first end of the chamber body in the axial direction and connected to cooling medium flow passages provided in a portion the spaces of the first mirror magnet, the second mirror magnet, and the cusp magnet;
a plurality of outflow passages formed at the first end and connected to cooling medium flow passages provided in a remaining portion of the spaces of the first mirror magnet, the second mirror magnet, and the cusp magnet; and
a turnaround passage formed at a second end of the chamber body opposite to the first end and connected to the cooling medium flow passages provided in both the portion and the remaining portion of the spaces.

11. The plasma source as recited in claim 10, wherein the spaces of the permanent magnets of the first mirror magnet, the second mirror magnet, and the cusp magnet are aligned in the axial direction.

12. The plasma source as recited in claim 10, wherein the inflow passage is formed radially around the chamber body at the first end of the chamber body, and the outflow passage is formed radially around the chamber body at the first end.

13. The plasma course as recited in claim 10, wherein the turnaround passage is formed in a ring shape, square shape, or a plurality of arc shapes around the chamber body at the second end.

14. The plasma source as recited in claim 10, wherein the chamber body further comprises an opening at the second end thereof.

15. The plasma source as recited in claim 1, wherein the first direction is an axial direction of the chamber body.

* * * * *